United States Patent [19]
Ebner

[11] Patent Number: 5,805,734
[45] Date of Patent: Sep. 8, 1998

[54] HYBRID IMAGING SYSTEM

[75] Inventor: Fritz F. Ebner, Rochester, N.Y.

[73] Assignee: Xerox Corporation, Stamford, Conn.

[21] Appl. No.: 756,666

[22] Filed: Nov. 26, 1996

Related U.S. Application Data

[63] Continuation-in-part of Ser. No. 625,324, Apr. 1, 1996.

[51] Int. Cl.[6] ................................................ H04N 1/405
[52] U.S. Cl. ........................... 382/237; 358/534; 358/456
[58] Field of Search ................................. 382/237, 252, 382/270; 358/456, 457, 458, 460, 466, 298, 534, 535, 536; 395/109

[56] References Cited

U.S. PATENT DOCUMENTS 5,014,333  5/1991  Miller et al. ............................. 382/252
5,394,252  2/1995  Holladay et al. ....................... 358/534

Primary Examiner—Scott Rogers

[57] ABSTRACT

A hybrid system for digitally screening black and white and/or color images using a number of imaging techniques is disclosed. A hybrid rendering system may be employed to improve image quality by rendering particular image areas according different halftoning schemes according to gray level.

12 Claims, 5 Drawing Sheets

HYBRID IMAGING SYSTEM PRESET MENU

*Directions:* a) Review Imaging system choices
b) Click on desired preset selection from the Preset Selection Menu

*IMAGING SYSTEM CHOICES*

*Matrix Dot:* Stochastic or random noise dot in an ordered 2x2 matrix (1,3,2 4 order), often useful in a variety of higher density color images.

*Cluster Dot:* Larger cluster of dots providing increased gray levels often useful in a variety of higher density color images.

*Random or Stochastic Dot:* Randomly generated noise dot (without ordered matrix); useful certain applications such as pictorials and graphics.

*Quad Dot:* Versatile halftoning method; often best for medium to high density images.

*White Noise:* Generally useful for lower density applications.

*Blue Noise:* Also generally useful for lower density applications.

*Error Diffusion:* Versatile halftoning method; often used for non-text images.

*PRESET SELECTION MENU*
*(FIRST THREE DISPLAYED; HIT "SCROLL DOWN" TO REVIEW OTHERS)*

GRAY LEVEL RENDERING PRESET # 1

| 65 | 256 |
|---|---|
| WHITE NOISE | CLUSTERED QUAD DOT |

GRAY LEVEL RENDERING PRESET # 2

| 85 | 192 | 256 |
|---|---|---|
| BLUE NOISE | CLUSTERED QUAD DOT | MATRIX DOT |

GRAY LEVEL RENDERING PRESET # 3

| 128 | 256 |
|---|---|
| ERROR DIFFUSION | CLUSTERED QUAD DOT |

HYBRID IMAGING SYSTEM

The present application is a continuation-in-part of application Ser. No. 08/625,324 filed on Apr. 1, 1996, also assigned to Xerox Corporation.

The present invention relates to a digitized hybrid imaging system as may be used in black and white or color printing systems (such as in electrophotographic printers and copiers), and more particularly, to an apparatus and method for improving output image quality according to the use of a plurality of imaging techniques in halftoning black and white and/or color documents.

In the operation of a copier or printer, particularly color machines, it is highly desirable to have means for processing and enhancing text and image quality (hereinafter referred to as "image quality" or the like unless otherwise noted). Particularly in the case of single or multi-pass color printers, it is highly desirable that an image processing system be employed to reduce imaging problems caused by halftoning systems not suited to a variety of image types. Likewise, certain image processing systems may be more successfully employed in particular printer hardware situations. While the present invention is quite suitable for use on the Xerox 4900 family of printers in which aspects of it have been tested, it may be likewise highly useful with a variety of other xerographic as well as non-xerographic printing systems.

In the process of digital electrostatographic printing, an electrostatic charge pattern or latent image corresponding to an original or electronic document may be produced by a raster output scanner on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied. Imaging systems may be more or less successful in printing high quality images of varying types in electrostatographic systems which may have output capabilities or efficiencies unlike those found in ink jet or other systems.

Various systems have been employed to include those set forth in the following disclosures which may be relevant to various aspects of the hybrid imaging systems of the present invention:

U.S. Pat. No. 5,477,305
Patentee: Parker et al.
Issued: Dec. 19, 1995

U.S. Pat. No. 5,341,228
Patentee: Parker et al.
Issued: Aug. 23, 1994

U.S. Pat. No. 5,323,247
Patentee: Parker et al.
Issued: Jun. 21, 1994

U.S. Pat. No. 5,321,525
Patentee: Hains
Issued: Jun. 14, 1994

U.S. Pat. No. 5,291,296
Patentee: Hains
Issued: Mar. 1, 1994

U.S. Pat. No. 5,111,310
Patentee: Parker et al.
Issued: May 5, 1992

U.S. Pat. No. 4,955,065
Patentee: Ulichney
Issued: Sep. 4, 1990

U.S. Pat. No. 4,736,254
Patentee: Kotera et al.
Issued: Apr. 5, 1988

U.S. Pat. No. 4,698,691
Patentee: Suzuki et al.
Issued: Oct. 6, 1987

U.S. Pat. No. 4,245,258
Patentee: Holladay
Issued: Jan. 13, 1991.

"Dithering with Blue Noise" by Robert A. Ulichney.

Proceedings of the IEE, Vol. 76, No. 1, January 1988. Pages 56–79.

"Modified Approach to the Construction of a Blue Noise Mask" by Meng Yao and Kevin J. Parker of the University of Rochester.

Journal of Electronic Imaging, January 1994, Vol. 3 (1). Pages 92–97.

"Digital Halftoning Using a Blue Noise Mask" by Theophano Mista and Kevin J. Parker of the University of Rochester.

SPIE Vol. 1452 Image Processing Algorithms and Techniques 11 (1991).

Pages 47–56.

U.S. Pat. No. 5,447,305 teaches a method of and system for rendering a halftone image of a gray scale image by utilizing a pixel-by-pixel comparison of the gray scale image against a blue noise mask disclosed in which the gray scale image is scanned on a pixel-by-pixel basis and compared on a pixel-by-pixel basis to an array of corresponding data points contained in a blue noise mask. Multiple masks may be used to halftone color images. Modifications can be made by a user to improve mask performance.

U.S. Pat. No. 5,341,228 teaches a method of and system for rendering a halftone image of a gray scale image by utilizing a pixel-by-pixel comparison of the gray scale image against a blue noise mask disclosed in which the gray scale image is scanned on a pixel-by-pixel basis and compared on a pixel-by-pixel basis to an array of corresponding data points contained in a blue noise mask stored in a PROM or computer memory in order to produce the desired halftoned image.

U.S. Pat. No. 5,323,247 also disclosed a method of and system for rendering a halftone image of a gray scale image by utilizing a pixel-by-pixel comparison of the gray scale image against a blue noise mask in which the gray scale image is scanned on a pixel-by-pixel basis and compared on a pixel-by-pixel basis to an array of corresponding data points contained in a blue noise mask stored in a PROM or computer memory in order to produce the desired halftoned image.

U.S. Pat. No. 5,321,525 discloses a method of quantizing pixel values in an image formed by a plurality of pixels, each pixel representing an optical density of the image at a location within the image, and having an original optical density value selected from one of a set of 'c' original optical density values that has a number of members larger than a desired output set of 'd' optical density values through a process of combined halftoning and cell-to-cell error diffusion.

U.S. Pat. No. 5,291,296 discloses a method of halftoning according to a "quad dot" system, and is also referred to below.

U.S. Pat. No. 5,111,310 discloses a method of and system for rendering a halftone image of a gray scale image by utilizing a pixel-by-pixel comparison of the gray scale image against a blue noise mask in which the gray scale image is scanned on a pixel-by-pixel basis and compared on a pixel-by-pixel basis to an array of corresponding data points contained in a blue noise mask stored in a PROM or computer memory in order to produce the desired halftoned image.

U.S. Pat. No. 4,955,065 discloses a digital image processing system for converting continuous tone pixel values representing an image into halftone or dithered pixel values, with the dithered pixel values representing each pixel having fewer bits than are used to represent each pixel in the continuous tone image.

U.S. Pat. No. 4,736,254 discloses a halftone signal having one of two discrete levels is generated for each print position along each print line by comparison between a gray scale value of an original with a threshold value stored in a memory. The memory having a matrix array of cells each storing a particular threshold value where M, N, a and β are integers.

U.S. Pat. No. 4,698,691 discloses a halftone image processing method for providing image information in a bit distribution by specifying a matrix pattern in response to tone data which is indicative of a recording density. Several matrix pattern groups which are prepared each comprising matrix patterns which are larger in number than dots which define a dot matrix.

U.S. Pat. No. 4,245,258 discloses an electrical screening system for binary displays or binary graphic recording systems which suppresses false contours. The suppression is achieved by increasing the number of gray levels that a given m×n matrix of pixels can represent.

The article "Dithering with Blue Noise" describes and compares image processing systems employing blue noise with error diffusion and other outputs.

Digital halftoning processes and desirable characteristics are compared and summarized; optimized blue noise generations are explained and demonstrated.

The article "Modified Approach to the Construction of a Blue Noise Mask" teaches a modified method of and system for rendering a halftone image of a gray scale image by utilizing a pixel-by-pixel comparison of the gray scale image against a blue noise mask. Steps to produce improved masks are explained.

The article "Digital halftoning Using a blue Noise Mask" likewise teaches earlier methods by Mista and Parker for rendering a halftone images of a gray scale utilizing a pixel-by-pixel comparison of the gray scale image against a blue noise mask.

In accordance with one aspect of the present invention, there is provided a system for digitally halftoning images according to a plurality of imaging techniques. The system may include a composite screen for halftoning a digitized image constructed according to the following steps:

selecting a first halftoning system of a first type having a first set of pixel placement characteristics; selecting a second halftoning system of a second type having a second set of pixel placement characteristics; determining a gray scale transition region for transitioning from the first halftoning system to the second halftoning system; and merging the first halftoning system with the second halftoning system so as to provide a hybrid halftoning system in the gray scale transition region, the hybrid halftoning system including a hybrid set of pixel characteristics of the first set of pixel placement characteristics and the second set of pixel placement characteristics.

Other features of the present invention will become apparent as the following description proceeds and upon reference to the drawings, in which:

FIG. 3 is a representative gray level rendering option menu screen of the present invention;

While the present invention will hereinafter be described in connection with preferred embodiments thereof, it will be understood that it is not intended to limit the invention to these embodiments. On the contrary, it is intended to cover all alternatives, modifications and equivalents, as may be included within the spirit and scope of the invention as defined by the appended claims.

Figure 5:
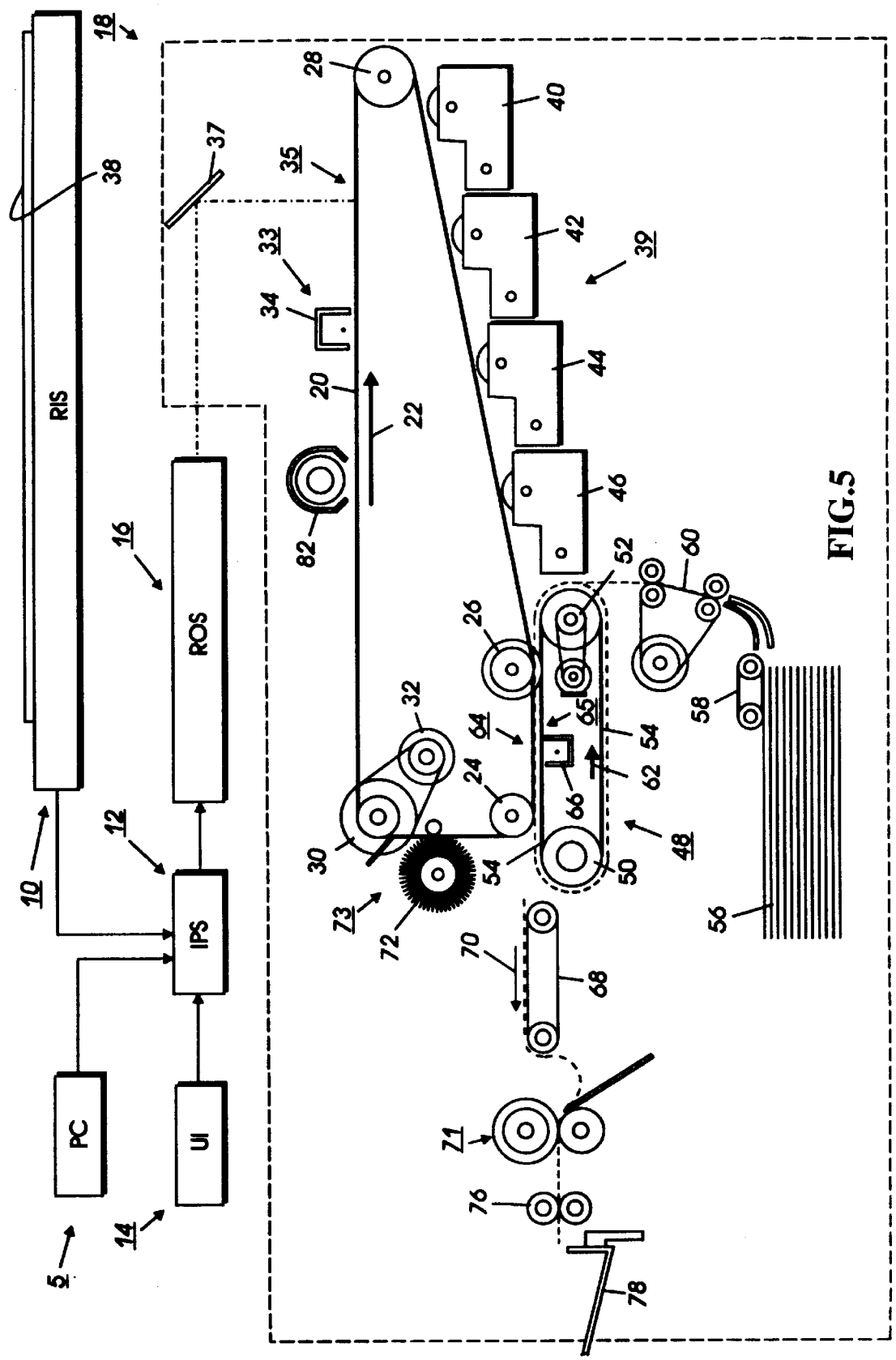
FIG. 5 is a schematic elevational view showing an exemplary color xerographic printing machine and networked PC incorporating features of the present invention therein.

For a general understanding of the features of the present invention, reference is made to the drawings. FIG. 5 is a schematic elevational view showing an exemplary electrophotographic printing/copying machine and a networked PC which may incorporate features of the present invention therein. It will become evident from the following discussion that the system of the present invention is equally well suited for use in a wide variety of printing and copying systems, and therefore is not limited in application to the particular system(s) shown and described herein.

To begin by way of general explanation, FIG. 5 is a schematic elevational view showing an electrophotographic printing machine and networked PC which may incorporate features of the present invention therein. An image processing station (IPS), indicated generally by the reference numeral 12, contains data processing and control electronics which prepare and manage the image data flow to a raster output scanner (ROS), indicated generally by the reference numeral 16. A network of one or more personal computers (PC), indicated generally by the reference numeral 5, is shown interfacing/in communication with IPS 12. A user interface (U1), indicated generally by the reference numeral 14, is also in communication with IPS 12.

U1 14 enables an operator to control and monitor various operator adjustable functions and maintenance activities. The operator actuates the appropriate keys of U1 14 to adjust the parameters of the copy. U1 14 may be a touch screen, or any other suitable control panel, providing an operator interface with the system. The output signal from U1 14 is transmitted to IPS 12. U1 14 may also display electronic documents on a display screen (not shown in FIG. 17), as well as carry out the system of the present invention as described in association with FIGS. 2 through 4 below.

As further shown in FIG. 5, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Digitized electronic documents may be created, screened, modified, stored and/or otherwise processed by PC 5 prior to transmission/relay to IPS 12 for printing on printer 18. The display of PC 5 may show electronic documents on a screen (not shown in FIG. 5). IPS 12 may include the processor(s) and controller(s) (not shown in FIG. 5) required to perform the system of the present invention.

IPS 12 also may transmits signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a rate of about 400 pixels per inch, to achieve a set of subtractive primary latent images. (Other implementations may include other pixel resolutions of varying types 600×600 dpi, or even asymmetrical resolutions, such as 300×1200 dpi, both configurations of which are employed in versions of the Xerox 4900 printer.) The ROS will expose the photoconductive belt to record three or four latent images which correspond to the signals transmitted from IPS 12. One latent image is developed with cyan developer material. Another latent image is developed with magenta developer material and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 5, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units." Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20. Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 5) extends between belts 54 and moves in unison therewith. A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 5) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 5) is secured releasably by the sheet gripper. As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color black removal is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle. As mentioned above, other xerographic and non-xerographic printer hardware implementations may be used with the hybrid imaging systems of the present invention, such as in the case of versions of the Xerox 4900 printer (which employs an intermediate transfer system) in which certain aspects of the system as outlined below have been tested.

Figure 1:
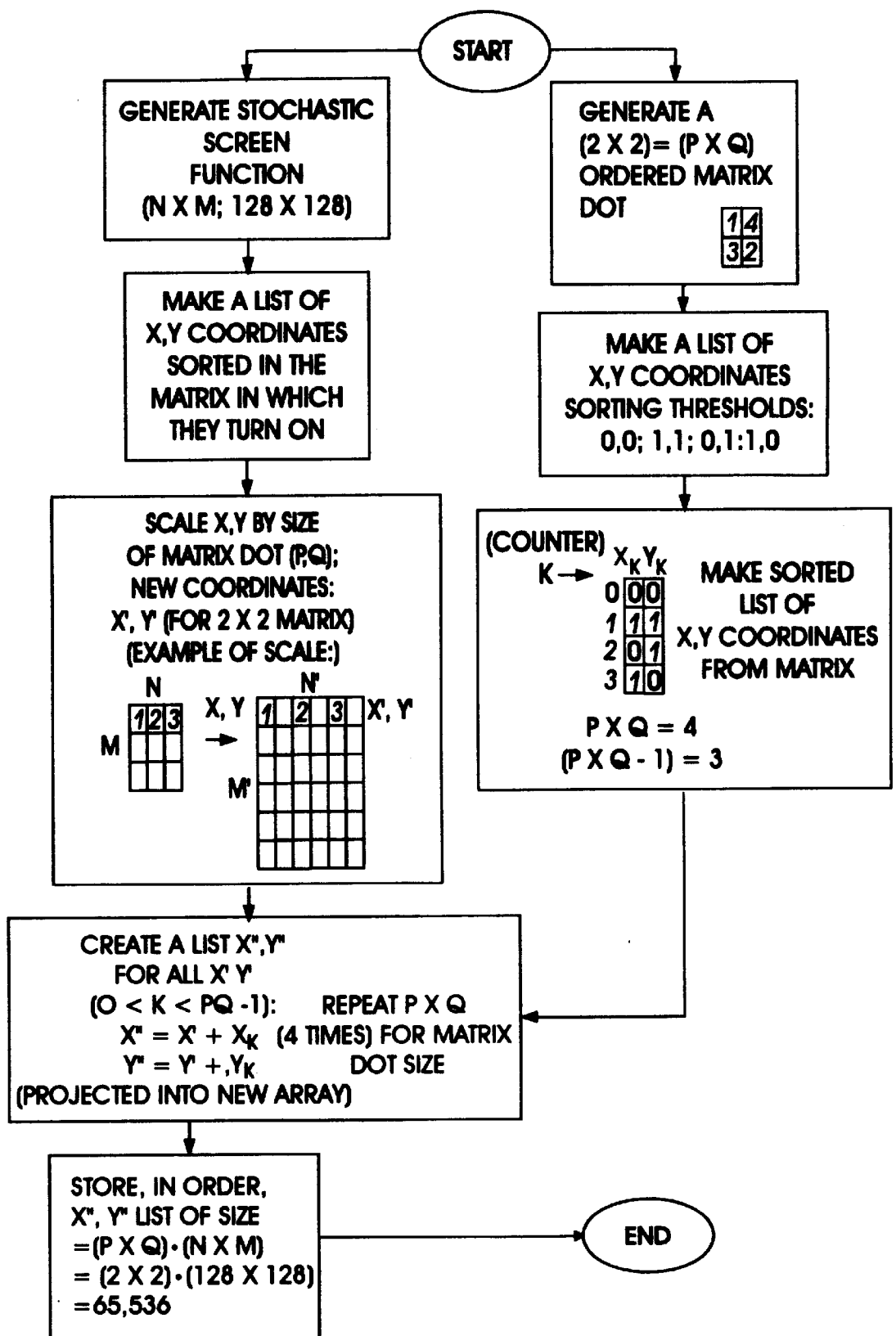
FIG. 1 is a flowchart showing a hybrid dot screening system of the present invention.

FIG. 1 shows a system for halftoning gray scale black and white or color images which utilizes pixel-by-pixel comparison of the image against a ordered hybrid dot screen. The system includes the use of a ordered dot matrix look-up table or thresholding system (such as a 2×2 ordered dot matrix), wherein each quadrant of the matrix is always filled in a particular order. For example, in an up to a 25% "fill" of a gray scale area printed output, the first designated quadrant of the matrix in a continuous halftone area will always be used or filled before the second ordered quadrant is utilized.

Within each of the gray scale quadrant halftoning ranges (0–25%, 26–50%; 51–75%; and 76–100%), halftoning may be accomplished using a variety of stochastic screening, thresholding, dithering, randomized dot systems (such as blue noise-emulating functions) or other compartmentally useful imaging techniques. While the deterministic nature of such an ordered dot system may not work well on some image types or with some imaging situations or hardware implementations (such as by resulting in "checkerboard" effects at the transition regions), such a system may be employed in many situations with good to excellent results.

FIG. 1 shows the hybrid "matrix" dot screen system in which a stochastic screen function of the dimensions M×N for use in selected instances (such as 128×128). Thereafter a list of x, y coordinates sorted in the matrix in the order in which they turn on is made. The scale of the matrix P×Q may preferably be linearly translated into the new coordinates. For a 2×2 matrix, the function is scaled according to the dimension shown in FIG. 1 of M' and N' and the coordinates of x' and y'. Thereafter a list for x" and y" is created for all x', y' coordinates; this operation is repeated $P^*Q$ (four times in the illustrated example) to create a matrix of the desired matrix dot size. Thereafter, the matrix is projected into a new array. At the same time, before or after the stochastic screen generation, the matrix dot scaling steps occur. Preferably a list of x, y coordinates for sorting thresholds at the coordinate 0,0; 1,1; 0,1; 1,0 are created. A counter sorted list of x, y coordinates for the matrix is thereafter generated. Again, these operations may preferably be performed linearly so as to create a more efficient system for generating the hybrid dot. Thereafter, an ordered list of the size $(P \times Q)^*(M \times N)$ that is $(2 \times 2)^*(128 \times 128)$ is generated resulting in 65,536 address list lookup table. Pixel-by-pixel comparison may thereby be performed on this hybrid dot screen or listed lookup table. The stochastic screen function may be of a nature to emulate blue noise or many other systems of generating random screens to fill in dot quadrants may be used, as described above and below.

The absence of low frequency components in the frequency domain corresponds to the absence of "disturbing artifacts" in the spatial domain (meaning the actual appearance of the dot profiles when printed). While the hybrid dot system of the present invention will result in ordered matrix dot filling, desirable outputs are obtained using the hybrid dot system. The cutoff frequency $f_g$, which is termed the Principal Frequency, depends as follows on the gray level g:

$$f_g = \begin{cases} \sqrt{g} \ /R \text{ for } g \leq \frac{1}{2} \\ \sqrt{1-g} \ /R \text{ for } g > \frac{1}{2} \end{cases}$$

where R, as before, is the distance between addressable points on the display and the gray level g is normalized between 0 and 1. According to this formula, $f_g$ achieves its maximum value where g=½ (50%), since at that level the populations of black and white dots are equal and thus very high frequency components appear in the binary image. It is at this gray level that would appear the most difficult location to attain dot profiles without disturbing artifacts.

In one example, a stochastic screen function may be generated according to a number of steps proposed in the Article "Modified approach to the construction of a blue noise mask":

1. Set the number M of pairs of 1's and 0's to be swapped in each iteration.
2. Rotate the 1-D filter with anisotropy to make the 2-D filter.

3. Create the initial binary pattern for level $g_1+\Delta g$ by converting randomly K0's to 1's in the binary pattern for $g$, (where K=W×w/L, W×W is the size of the BNM and L is the total number of levels).
4. Take the FFT (fourier transform) of the binary pattern for level $g_1+\Delta g$.
5. Filter the current binary pattern with the 2-D filter appropriate for level $g_1+\Delta g$.
6. Take the IFFT (inverse fourier transform) of the filtered pattern.
7. Form an error array by computing the difference between the filtered pattern and $g_1+\Delta g$.
8. Sort the errors into two cases:
   For the K1's that are in the binary pattern for level $g_1+\Delta g$ but not in the binary pattern for $g_1$, sort the positive errors.
   For the 0's in the binary pattern, sort the negative errors.
9. Swap the M pairs of 1's and 0's that have the highest positive errors and negative errors.
10. Compute the MSE (mean square error) of the filtered pattern with respect to the gray level $g_1+\Delta g$. If the MSE drops, go to step 5 and proceed to the next iteration. If the MSE increases but M≠1, reduce M by half, go to step 5. Otherwise, go to step 12.
11. Update the mask:

$$m[i,j] = \overline{m[i,j]} + \frac{1}{\overline{bp[i,j,g_1+\Delta g]}}$$

where the bar is the NOT operation.
12. If $g_1+\Delta g<255$, let $g_1=g_1+\Delta g$ reset M, and go to step 2.

This further modified approach for the generation of a blue noise-emulating function can be enhanced by performing additional steps. For example, the dynamic range does not work well in some printer hardware system implementations. The method was not designed to be used as part of a hybrid dot as required in the present invention. By way of further example, the aforementioned method does not relate the amount of residual low frequency power in executing the error decision when determining the swaps made at each level. Lastly, the algorithms may not be readily adaptable for automatic execution on a computer.

The hybrid dot system preferably includes a modified iterative stochastic screen function generated according to the following steps:
A. Generate a stochastic function with the steps proposed above. (Equal numbers of pixels are turned on in each step.)
B. Take the $L^*$ (luminance or "lightness") measurement of the resultant stochastic function.
C. Invert the measurement curve so that the output $L^*$ curve is linear with respect to digital count.
D. Use the inverted curve to determine the number of pixels to turn on at each level.
E. Generate the first level bitmap as "seed".
F. Starting at level above, calculate the number of pixels to turn on at the current level according to the inverted $L^*$ curve.
G. Use the numbered steps outlined above to identify the locations with highest DC level and pixel value of 0.
H. For the number of pixels to be turned on at the current level, turn on pixels at locations with highest DC level in a descending order.
I. Sort pixels that is currently off (0) in a descending order of DC level. Repeat the same procedure on pixels that are turned on (1) at this level.
J. Swap N pixels on each list K. If the resultant DC level of the bitmap decreases, repeat step G. Otherwise, divide N by 2 and repeat step G. If N=1 restart loop with half of the pixels to begin with. If the starting value of N=2, repeat step G until the DC level of the bitmap reaches a steady state.
L. Take the FFT; look for maximum DC levels within transform range. Look up number of pixels to be added to the next level from the step D inverted curve.
M. Add pixels to positions of highest DC value in descending order. Go to step G and repeat.

In this manner, an improved stochastic function can be generated for use in the hybrid dot of the present invention. Several important aspects of the improved methods outlined above enable optimization of the function to be used in the hybrid dot. First by actually measuring luminance on a sensing device as set forth in step B, the outputs of the screen can be known and its performance optimized according to the printing hardware (such as the 4900) that the screen will be used on. Further, steps B–F involve a summation operation that by using the inverted curve permits the creation of a more linear (consistent) output. Additionally, the DC levels (step K) are placed in a buffer, at which time the repeatability of the results can be established, such that "steady state" conditions may be identified and checked. Finally, the system employs a repeating loop logic that permits the levels of the improved screen to be built automatically.

Figure 2:
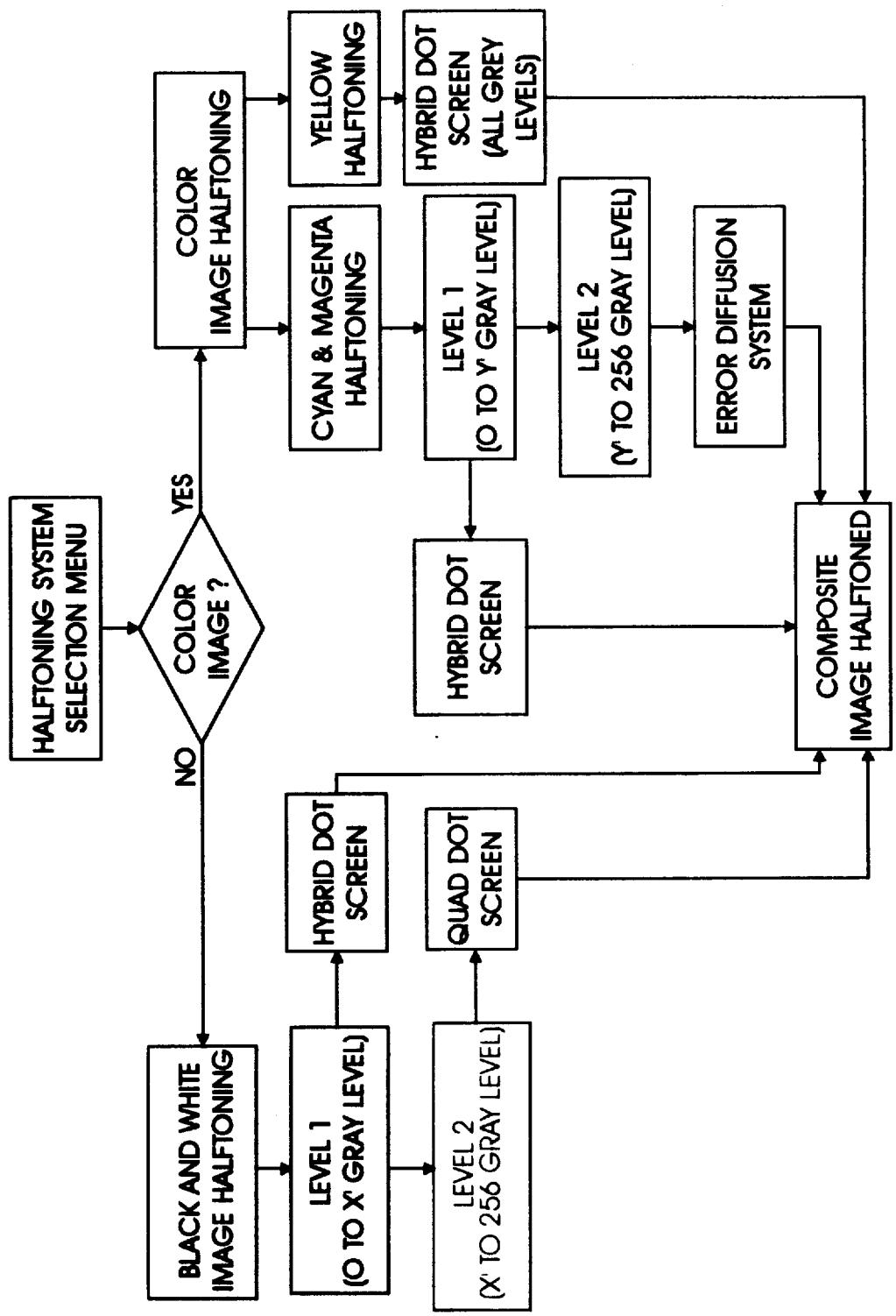
FIG. 2 is a flowchart showing the exemplary use of multiple image screening techniques in a system of the present invention.

FIG. 2 shows a halftoning menu system which in itself can employ an imaging system including a further "hybrid" imaging system including multiple types of screening or imaging techniques in generating or rendering black and white or color images. For example, black and white image halftoning might be performed such that at level 1, that is, 0 to x' gray levels hybrid dot screening according to the system outlined above with regard to FIG. 1 may be performed. With regard to level 2, that is, x' up to 256 gray levels quad dot screening according to U.S. Pat. No. 5,291,296 (incorporated herein by reference) may be used. By way of further example according to the system set forth in FIG. 2, if only 3 color print imaging is employed, certain colors may be halftoned according to designated gray levels while other colors are halftoned according to a different gray level screening technique. FIG. 2 also shows an embodiment in which cyan and magenta halftoning is performed at two different levels by two different halftoning systems. At level 1, that is, 0 to y', gray level hybrid dot screening may be performed, whereas at gray level 2, that is, y' to 256 gray level, an error diffusion system is used to halftone these gray levels. As further shown in the example of FIG. 2, for yellow images, halftoning is completed by a single method (hybrid dot screening) for all gray levels. When undercolor removal is used (that is, black toner is used to darken the output image to the correct level so as to lower colored toner use levels), the entire FIG. 2 system may be used. The FIG. 2 color image halftoning scenarios can be modified in a variety of situations in accordance with the spirit of the present invention. In the color imaging breakdown portion suggested, the FIG. 2 example highlights such concepts as, for example, that for a lighter color such as yellow, the imaging system may be less critical to the output of the final halftoned image. For certain (such as darker) colors, the halftoning system used may be more critical and have a greater influence over the quality of the image generated at particular gray levels.

In accordance with the system described in association with FIG. 2, a variety of modifications are envisioned such that the quality of the final rendered composite (1–4 color) halftoned image is maximized. Modifications on the hybrid imaging system of the present invention may be used to reduce the occurrence of undesirable image artifacts such as contouring in the highlight regions, noisiness of halftone images through all gray levels and other undesirable effects may be employed. The hybridized use of multiple screening techniques capitalizes on the fact that certain gray level ranges can mean more desirably halftoning with a particular screening technique. Finally, in some instances, when a particular color or image type is being gray scaled (such as yellow), the system recognizes that the most efficient (and simplified) gray scale imaging technique can be used without detriment to the image quality of the final composite image.

The hybrid dot thresholding system of FIG. 1 has been shown to be particularly useful as an imaging option in four color printers, such as in the Xerox 4900 family of printers. The 4900 or other networkable or as a stand-alone printers or copiers may permit users to select between several halftoning options. In one embodiment, a 128×128 (N×M) size stochastic or blue noise emulating function may be used in conjunction with the 2×2 ordered dot matrix to achieve a desired output of 256 gray levels in both black and white or color implementations. A linearized scaled function permits projection into the hybrid dot array according to a sorted list of matrix dot coordinates. The resultant method can yield quality dot patterns across the gray scale. A single hybrid dot halftoning system may be used for each color, or different thresholding (hybrid dot or other) systems may be used. While the ordered filling of this ordered dot system can result "checkerboard" effects (particularly at or near the 25%, 50% or 75% dot fill areas), this effect can be quite desirable in many imaging scenarios, (or other halftoning systems may be used to prevent particularly undesirable outputs that might be generated as a result of this system as shown in FIG. 2).

In traditional halftone technology, there may often be a tradeoff between the use of the standard number of gray levels (256) in a dot profile and the spatial frequency of the screen. If the resolution of the dot was high, then it sacrificed the number of gray levels (i.e., the number of micro dots in a halftone cell). The most common dot growth pattern is known as a clustered dot. This type of screen grows out from the center of the dot as the gray levels increase. Several alternatives to this tradeoff have been employed with varying success. For instance, a matrix dot that is several times larger than a traditional cluster dot, but has multiple centers can be used to achieve a larger number of levels without sacrificing spatial resolution. The Xerox quad dot (U.S. Pat. No. 5,291,296) discussed above is an example of a multi centered dot with 4 centers and the ability to have 4 times as many levels. This dot can significantly improve image quality. There is a limit to the number of centers one can design into this dot because low frequency artifacts become more apparent as the dot grows. Another approach to halftoning is error diffusion. Here, a gray level is thresholded and the error between the threshold and the gray level is distributed downstream to neighboring pixels. This technique is very good at rendering pictorial images, although it exhibits "worm" like structures and is computationally intensive to implement. Typically, extra hardware is necessary to perform error diffusion in a timely manner.

The FIG. 1 system provides desirable halftoning results particularly for pictorial images is stochastic screening. The halftone cell is relatively large and affords many gray levels, and avoids problems that can occur with a large dot by minimizing visual structure within the dot itself. In some scenarios, stochastic screens are used wherein the constraint to minimize visual structure is to generate high frequency noise with the principle frequency in a relatively insensitive region of the human visual contrast sensitivity function. Such masks typically appear to be visually noisier than structured dots, although the increased latitude in number of levels makes them valuable. The selective combination of several thresholding techniques can potentially solve the problems of low frequency structure of multi centered dot and the perceived noisiness of stochastic by utilizing several halftoning system on a selective basis, depending on gray level thresholds or ranges. For example, a quad dot system may be merged in such a way with another imaging technique that the advantageous properties of both approach may be used to create a hybrid significantly better than one system or another. The present invention allows different screening or thresholding systems to be selectively used to render image areas according to gray level. Further, different object types may also be rendered differently. (The term "object" as used herein generally refers to image types including text, graphics and bitmaps, although other classes or types of objects may differentiated in other systems.) For example, graphic objects often desirably may be output with vivid, bold colors than other types of images, while photos generally need to have less dramatic, more natural tones applied to produce a more desirable output. A particular desired colorization scheme may be related to the halftoning system used. The limitations and/or characteristics of particular print engines can also dictate which halftoning, screening or thresholding systems are most useful in rendering a multi-object document or image.

FIG. 3 shows an exemplary user interface hybrid halftoning selection system, in which a "Hybrid Imaging System Preset Menu" is used to display select the various available gray level rendering options A user can proceed to display a graphical representation of one or more presets on screen display 100, and then select for implementation a preloaded gray level rendering preset from the available menu selections. Gray Scale Level Rendering Preset display portions (shown as "Preset" #1, 2 and 3 in FIG. 3) can be used to graphically represent the use of two or more in which one imaging technique transitions to (or merges with) another, as described in greater detail below. Some of the types of rendering techniques that may be selected according to the FIG. 3 menu are as follows:

Matrix Dot: Stochastic or random noise dot in an ordered 2×2 matrix (1,3,2 4 order), often useful in a variety of higher density color images.

Cluster Dot: Larger cluster of dots providing increased gray levels often useful in a variety of higher density color images.

Random or Stochastic Dot: Randomly generated noise dot (without ordered matrix); useful certain applications such as pictorials and graphics.

Quad Dot: Versatile halftoning method; often best for medium to high density images.

White Noise: Generally useful for lower density applications.

Blue Noise: Also generally useful for lower density applications.

Error Diffusion: Versatile halftoning method; often used for non-text images.

Combinations and variations on these techniques may also be used, such as are included in selection #1 shown on the of the representative menu screen of FIG. 3. The descriptions provided above are intended to be exemplary of the type of information to be provided to a user on the display, and while being useful in some situations, may not hold true in many imaging applications.

In some imaging applications, a single size cluster halftone screen simply does not provide enough simulated gray levels. Larger sized dot cluster systems may result in more pleasing/higher quality rendered images. The present invention includes a system in which one imaging system is transitioned to another imaging system, whereby a rendering system (such as clustered quad dot) is effectively merged with a second imaging system (such as white noise) to provide relatively contour-free transitioning from one imaging system to another.

In the selection #1 example of FIG. 3, a Cluster Quad Dot rendering system is merged with a White Noise rendering system by of the present invention. For example, beginning (in a descending manner) at gray level 65, pixels are removed from a cluster dot rendering system according to a white noise pattern. In this manner, additional gray levels are added to the cluster dot rendering system through this merging of one rendering system with another. In this manner, in the transition zone, the two imaging techniques are related related to each other; that is, the transition zone join the two imaging techniques so as to include aspects or traits of both. By way of example, as pixels are removed from a cluster dot rendering system at gray level 65 according to a white noise pattern (Preset #1 of FIG. 3) just below gray level 65, as only a few dots in the clusters are removed, the imaging technique is a closer relative of the cluster dot rendering system than the white noise rendering system it gradually transitions to. Distinctive and undesirable contouring or "stepping" can be thus be avoided or minimized.

U.S. application Ser. No. 08/753,576 "entitled Cluster Dot Halftoning System" filed on the same date as the present application and also assigned to Xerox, describes in relevant part an optimization technique that can be used to in the transition region described above, and is incorporated herein by reference. This implementation of the system of the present invention provides that pixels are turned-on in clusters but the clusters themselves are "selected" based on a optimized stochastic or randomized screening system. In traditional stochastic screen design, it is the turn-on order of each pixel that is stochastic instead of a cluster of pixels. In particular, the screen of the present invention is useful to eliminate moire patterns as well as to provide for a more stable imaging platform (that is, a process that will be less prone to resulting in undesirable image outputs such as may occur in xerographic or other types of print engines). The present invention thus permits the combination of two or more imaging systems so as to capitalize on the advantages and/or minimize the weaknesses of each imaging technique. A variety of halftone screens may be used in conjunction with the present invention, to include the examples described or incorporated herein by reference above.

Figure 4:
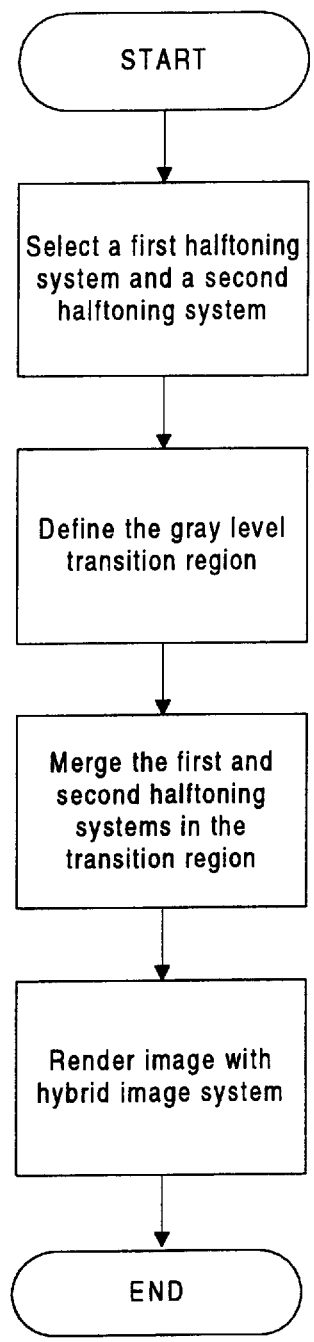
FIG. 4 is flow chart of an embodiment of the present invention.

The FIG. 4 flow chart provides a general description of how a hybrid imaging system is assembled composite screen system 100 may be assembled according to one embodiment of the present invention (as will later be described in additional detail.) A composite screen for halftoning a digitized image is constructed according to FIG. 4. In a first or preliminary step, the multiple halftoning systems to be used to create a hybrid or composite screen (such as the "Gray Scale Level Rendering Presets" 1, 2 and 3 shown in FIG. 3). FIG. 4 shows this step as the block "Select a first halftoning system and a second halftoning system". Next, the gray scale transition region or start point for transitioning from the first halftoning system to the second halftoning system must be established. This step is shown as the "Define the gray scale transition region" block in FIG. 4. In the next step, the first halftoning system is merged with the second halftoning system so as to provide a hybrid halftoning system in the gray scale transition region. In order to insure a smooth transition of the first halftoning system having what may be called a first set of pixel placement characteristics to the second halftoning system having a second set of pixel placement characteristics. This step is shown as the "Merge the first and second halftoning systems in the transition region" block of FIG. 4. The transition region must, as described in the examples above, include characteristics or traits that are a hybrid or combination of these two systems. Thereafter, the image is rendered with the composite or hybrid image system, according to the "Render Image with Hybrid Image System" block of FIG. 4.

While present invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A method of constructing a composite screen for halftoning a digitized color image having a predetermined number of color separations, comprising:

selecting a first halftoning system of a first type having a first set of pixel placement characteristics;

selecting a second halftoning system of a second type having a second set of pixel placement characteristics;

determining a gray scale transition region for transitioning from the first halftoning system to the second halftoning system;

merging the first halftoning system with the second halftoning system so as to provide a hybrid halftoning system in the gray scale transition region, said hybrid halftoning system including a hybrid set of pixel characteristics of said first set of pixel placement characteristics and said second set of pixel placement characteristics, and rendering a first number of color separations of a color image using said hybrid halftoning system, the first number of color separations being equal to a value which is less the predetermined number of color separations.

2. The method of claim 1, wherein the gray scale includes 256 gray levels.

3. The method of claim 2, wherein an upper gray scale limit of the transition region is 65.

4. The method of claim 1, wherein the first halftoning system is a cluster dot halftoning system.

5. The method of claim 1, wherein the first halftoning system is a matrix dot halftoning system.

6. The method of claim 1, wherein the first halftoning system is a stochastic dot halftoning system.

7. The method of claim 1, wherein an upper gray scale limit of the transition region is equal to approximately one quarter of a total number of available grey levels.

8. A method of constructing a composite screen for halftoning a digitized image, comprising:

selecting a first halftoning system of a first type having a first set of pixel placement characteristics;

selecting a second halftoning system of a second type having a second set of pixel placement characteristics;

determining a gray scale transition region for transitioning from the first halftoning system to the second halftoning system; and merging the first halftoning system with the second halftoning system so as to provide a hybrid halftoning system in the gray scale transition region, said hybrid halftoning system including a hybrid set of pixel characteristics of said first set of pixel placement characteristics and said second set of pixel placement characteristics;

selecting a third halftoning system of a second type having a third set of pixel placement characteristics;

determining a second gray scale transition region for transitioning from the second halftoning system to the third halftoning system; and merging the second halftoning system with the third halftoning system so as to provide a hybrid halftoning system in the second gray scale transition region, said hybrid halftoning system including a second hybrid set of pixel characteristics of said second set of pixel placement characteristics and said third set of pixel placement characteristics.

9. The method of claim 8, wherein the first halftoning system is a matrix dot halftoning system.

10. The method of claim 8, wherein the first halftoning system is a stochastic dot halftoning system.

11. The method of claim 8, wherein the first halftoning system is a cluster dot halftoning system.

12. The method of claim 8, wherein an upper gray scale limit of the transition region is equal to approximately one quarter of a total number of available grey levels.

* * * * *